June 17, 1969
G. M. HANES
3,450,826
TRANSPOSITION FOR BUS BARS
Filed Dec. 30, 1966
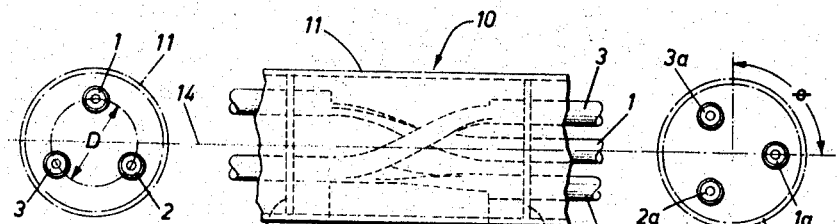
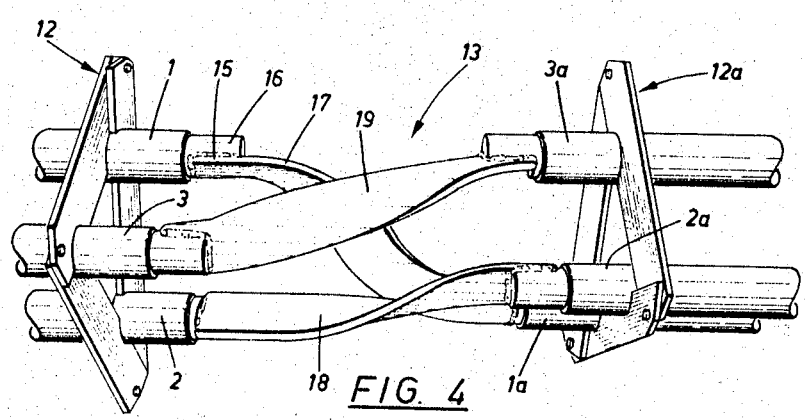
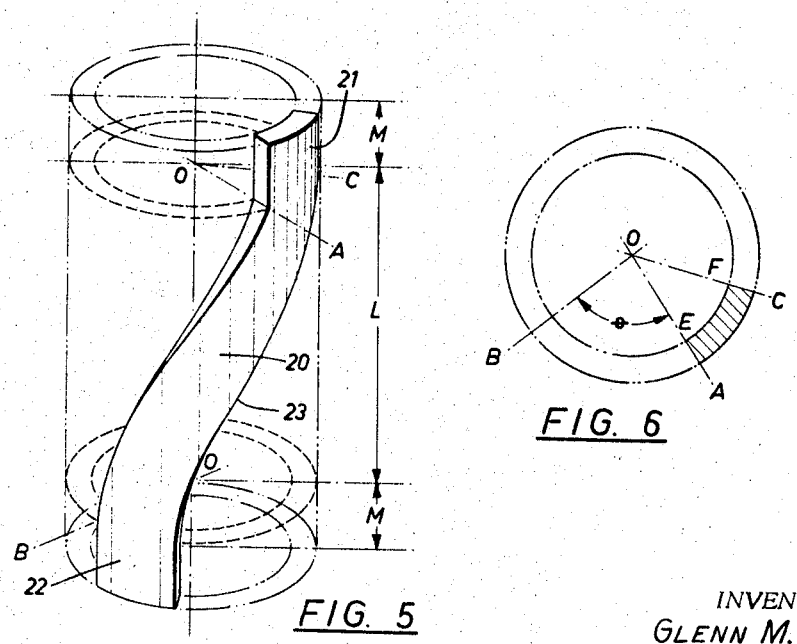
INVENTOR.
GLENN M. HANES,
BY William Freedman
ATTORNEY

United States Patent Office 3,450,826
Patented June 17, 1969

---

3,450,826
TRANSPOSITION FOR BUS BARS
Glenn M. Hanes, Lakefield, Ontario, Canada, assignor to Canadian General Electric Company, Limited, Toronto, Ontario, Canada, a corporation of Canada
Filed Dec. 30, 1966, Ser. No. 606,122
Int. Cl. H01b 11/06
U.S. Cl. 174—34          9 Claims

ABSTRACT OF THE DISCLOSURE

Disclosed is a transposition for electric bus bars spaced apart in a circular pattern inside a metal duct. The transposition comprises curved strips cut helically from a tube having approximately the same outside diameter as the diameter of the circle on which the centers of the bus bars are located. These strips are connected between the ends of circumferentially-spaced bus bars in longitudinally-adjacent bus bar groups.

---

This invention relates to a transposition for a number of bus bars, and in particular to a number of bus bars isolated inside a metallic duct.

The use of a number of bus bars enclosed in a single metallic duct is well known for transmitting multiphase currents at moderately high voltages. In these systems the bus bars are supported inside the duct in spaced relation to one another and to the walls of the duct by means of insulating structures located inside the duct at spaced intervals. Various insulating structures are used, one of which is disclosed and claimed in U.S. patent application S.N. 508,078, Rehder and Swerdlow, filed Nov. 16, 1965, now Patent No. 3,349,168.

As is well known, it is often necessary to transpose the bus bars in a metalclad assembly in order to bring them into the proper phase relation with the terminals to which their ends are connected, e.g., the terminals of a generator or transformer. Once one or more bends have been made in a run, the bus bars have changed positions in the duct so the two ends of the bars are no longer in the same relative positions. When the bus bars of a multiphase AC system are of appreciable length, they are transposed at intervals along their length in order to minimize inductive losses. Bus bars are difficult to transpose by simple low cost means. A transposition made by bending the bars is difficult to execute and expensive; a simple transposition made by breaking each bar and welding a straight piece of conductor to the broken ends reduces the clearances between the conductors; and a transposition made by welding a number of pieces together so as to maintain the clearances leads to complex weld assemblies.

My invention uses single pieces welded to the broken ends of the bus bars as in the second instance, but the pieces are curved rather than straight so there is very little or no reduction in conductor clearances at the transposition. In a preferred embodiment of the invention, I cut the strips helically from a tube or tubular segment having approximately the same outside diameter as the diameter of the circle on which the centers of the bus bars are located. Hence the helical strips now constituting the transposition remain equally spaced through their length and are located between cylindrical planes which lie within the boundaries defined by the bus bars.

A specific embodiment of the invention will now be described with reference to the accompanying drawings in which:

FIG. 1 is a view in elevation of a transposition of three bus bars;

FIGS. 2 and 3 are end views of FIG. 1;

FIG. 4 is a view in perspective of a transposition made according to the invention;

FIG. 5 is a view in perspective of a tube from which the transposing pieces of FIG. 4 are cut; and FIG. 6 is an end view of FIG. 5.

FIG. 1 illustrates a three phase metalclad bus bar assembly 10 wherein three bus bars 1, 2 and 3 are supported at spaced intervals inside a circular metallic duct 11 by means of a number of generally triangular insulating supports 12, 12a of the kind described in the above mentioned application 508,078. Supports 12, 12a maintain the bus bars equally spaced from one another and from the wall of the duct, and they also insulate the bus bars from one another and from the duct. It will be noted from FIG. 2, a view of the left end of the assembly, that the particular bus bars illustrated are circular and have their centers on a circle which is concentric with the duct and has a diameter D. The region 13 in the middle of FIG. 1 denotes a transposition of the three bus bars from the position shown in FIG. 2 to the position shown in FIG. 3. In other words, in progressing from left to right through the distance 13 the bus bars have been rotated about the longitudinal axis 14 of the assembly through the angle θ, in this particular instance 90°. In rotating through the angle θ, the bars have changed position from that shown at 1, 2 and 3 in FIG. 2 to that shown at 1a, 2a, and 3a in FIG. 3.

A transposition 13 made according to my invention will now be described. This transposition is made by cutting the bars on a transverse plane and separating one group of the cut ends from the other by the axial distance indicated at 13 and the angular distance indicated by angle θ. As shown in FIG. 4, the end of each bar has a portion 15 cut away on the inside of the triangular configuration so as to leave an outer semicylindrical extension 16 for purposes of welding to the transposing pieces 17, 18 and 19 which are used to connect bar 1 to 1a, 2 to 2a, and 3 to 3a.

Transposing pieces 17, 18 and 19 are cut from a relatively thick walled tube as illustrated in FIGS. 5 and 6 to the shape shown at 20. This tube has an outside diameter about the same as diameter D in FIG. 2, the diameter of the circle on which the centers of bars 1, 2 and 3 are located. Each one of the transposing pieces 20 has a pair of short axial end portions 21, 22 offset angularly by the angle θ and joined by a relatively long helical portion 23 of tube length L, where L is the length indicated at 13 in FIG. 1. Since the cuts can be made radially and all the pieces are alike, the number of pieces required for a transposition can usually be cut consecutively from a single tube. In the illustration of FIGS. 5 and 6, the cuts are made on radii OC and OA to produce a piece 20 of axial length L+2M and cross section FCAE equal to the cross section of the bus bars. This piece has a pair of axial end portions 21, 22 each of length M and a mid portion 23 which in progressing axially through length L also rotates through angle θ, i.e., the angle between OA and OB.

Instead of cutting the transposing pieces from a tube as illustrated in FIG. 5, they may be cut from a curved piece having the shape of a tubular segment. The curved piece may be made by bending, e.g., rolling, a flat plate to the proper curvature so it looks like a portion of a tube. This second approach is a convenience when a tube of the correct diameter is not available but plate stock and bending equipment are. Hence the expression "pieces cut helically from a tubular segment" is intended to include pieces cut from either a tube, or from a tubular or semitubular form.

Transposing piece 17 is placed between bars 1, 1a on the steps thereof such that the outer surface of end portion 21 rests on the diametrical surface of extension 16 of bar 1 and the outer surface of end portion 22 rests on a like surface of bar 1a as best illustrated in FIG. 4.

Bars 1, 1a are welded to piece 17 along the adjoining edges of the bars and the piece. Pieces 18 and 19 connect bars 2 to 2a and 3 to 3a respectively in the same way.

Preferably, the bus bars, the transposing pieces, and the weld deposits will be made from the same kind of metal, e.g., aluminum or copper, and the bars, pieces, and joints will be designed to similar current carrying standards. In the transposition illustrated in FIG. 4, the bus bars are thick walled tubes and the inside and outside widths FE and CA respectively of the transposing pieces are a little greater than the outside diameter of the tube. The stepped type of joint illustrated in FIG. 4 is but one of a number of joints suitable for connecting a bus bar to a transposing piece. This particular joint was selected because it is relatively easy to make and has good electrical and mechanical characteristics. In those installations where the bus bars are covered with an outer sleeve of insulating materials, the transposing members and the joints will also be covered with one or more layers of insulating materials such as tapes. Although tubular bus bars are illustrated, the invention can be applied to other shapes as well, which need not necesarily be circular in cross section.

In the particular transposition illustrated in the drawings, angle $\theta$ is equal to 90°. From an examination of FIGS. 5 and 6 it is apparent that this angle can be readily increased or decreased by altering the length L, by altering the pitch of the helical portion 23, or by a combination of the two. Hence the helical transposing pieces 20 are suitable for use in making transpositions of varying degrees of conductor rotation. Since the helical pieces are segments of a tube of about the same outside diameter as the diameter of the circle in which the centers of the bus bars lie, the pieces can be readily placed in a transposition of the general configuration of the tube. This allows a transposition to be made in the regular duct without altering the electrical clearances appreciably. Moreover, helical transposing pieces present smooth contours in the transposition.

While I have shown and described a particular embodiment of the invention, it will be obvious to those skilled in the art that various changes and modifications may be made without departing from my invention in its broader aspects and I, therefore, intend in the appended claims to cover all such changes and modifications as fall within the true spirit and scope of my invention.

What I claim as new and desire to secure by Letters Patent of the United States is:

1. In an enclosed bus bar assembly,
   (a) a metal duct;
   (b) a first group of bus bars supported inside said duct lengthwise thereof in spaced relation to each other and to the duct,
   (c) a second like group of bus bars supported inside said duct in a similar way,
   (d) the bus bars of said first group having ends spaced from the ends of the bus bars of said second group,
   (e) a transposition interconnecting the ends of said groups of bus bars,
   (f) said transposition comprising a group of transposing pieces cut helically from a tubular segment and spaced one from another in a generally circular pattern having the curvature of said segment, with one end of each transposing piece connected to a different one of said ends of the bus bars in said first group and with the other end of each transposing piece connected to a different one of said ends of the bus bars in said second group.

2. The bus bar assembly defined in claim 1 wherein the bus bars in each group are equally spaced in a circle having about the same radius as the radius of curvature of the outside surface of the tubular segment.

3. The bus bar assembly defined in claim 2 wherein the bus bars are tubular conductors and the bars in each group have their centers on said circle.

4. In an enclosed bus bar assembly,
   (a) a circular metal duct;
   (b) a first group of three circular bus bars supported inside said duct spaced from the walls thereof with the axes of the bars equally spaced on a circle concentric with the axis of the duct;
   (c) a second group of three circular bus bars supported inside said duct spaced from the walls thereof with the axes of the bars equally spaced on said circle and the bars displaced angularly in relation to the bars of said first group;
   (d) the bus bars of said first group having ends spaced from the ends of the bus bars in said second group;
   (e) a transposition interconnecting the ends of said groups of bus bars;
   (f) said transposition comprising three transposing pieces cut helically from a tubular segment of a radius of curvature about equal to the radius of said circle and to a pitch equal to the angular displacement between said two groups of bars;
   (g) said transposing pieces being spaced one from another in a generally circular pattern with one end of each transposing piece connected to a different bar in said first group and with the other end of each transposing piece connected to a different bar in said second group.

5. The bus bar assembly defined in claim 4 wherein each end of each transposing piece has a short extension fitted to a mating portion on the end of the bus bar, and said extension and said portion are welded together.

6. The bus bar assembly defined in claim 4 wherein the radius of curvature of the outer surface of said segment is about equal to the radius of said circle.

7. The bus bar assembly defined in claim 4 wherein the radius of curvature of the inner surface of said segment is about equal to the radius of said circle.

8. The bus bar assembly defined in claim 4, wherein each end of each transposing piece has a short extension fitted to and welded to a mating portion on the end of the bus bar, the radius of curvature of the outer surface of said segment being about equal to the radius of said circle.

9. The bus bar assembly of claim 4 wherein each end of each transposing piece has a short extension fitted to and welded to a mating portion on the end of the bus bar, the radius of curvature of the inner surface of said segment being about equal to the radius of said circle.

References Cited

UNITED STATES PATENTS 2,216,870  10/1940  Adam _____ 174—34 XR
2,786,152  3/1957  Fisher _____ 174—33 XR DARRELL L. CLAY, *Primary Examiner.*

U.S. Cl. X.R.
174—88; 307—147